United States Patent
Sakaguchi et al.

(10) Patent No.: US 10,252,748 B2
(45) Date of Patent: Apr. 9, 2019

(54) DRIVING ASSIST DEVICE

(71) Applicant: TOYOTA JIDOSHA KABUSHIKI KAISHA, Toyota-shi, Aichi-ken (JP)

(72) Inventors: Eiji Sakaguchi, Susono (JP); Masaki Takano, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 154 days.

(21) Appl. No.: 15/252,283

(22) Filed: Aug. 31, 2016

(65) Prior Publication Data
US 2017/0057543 A1 Mar. 2, 2017

(30) Foreign Application Priority Data
Sep. 1, 2015 (JP) .................. 2015-171844

(51) Int. Cl.
*B62D 15/02* (2006.01)
*G01C 21/36* (2006.01)

(52) U.S. Cl.
CPC ......... *B62D 15/029* (2013.01); *B62D 15/025* (2013.01); *B62D 15/026* (2013.01); *G01C 21/3658* (2013.01)

(58) Field of Classification Search
CPC .............. B62D 15/025; B62D 15/0255; B62D 15/026; B62D 15/029; G01C 21/3626–21/3661
See application file for complete search history.

(56) References Cited

U.S. PATENT DOCUMENTS

| 6,061,628 A | * | 5/2000 | Hayashi | G01C 21/32 340/990 |
| 2014/0005923 A1 | * | 1/2014 | Bank | G01C 21/3658 701/424 |
| 2014/0156182 A1 | * | 6/2014 | Nemec | G05D 1/021 701/430 |
| 2016/0357281 A1 | * | 12/2016 | Fleizach | H04N 3/155 |

FOREIGN PATENT DOCUMENTS

| JP | 2004-102536 A | 4/2004 |
| JP | 2013-131144 A | 7/2013 |
| JP | 2014-021051 A | 2/2014 |
| WO | 2012/047743 A2 | 4/2012 |

\* cited by examiner

*Primary Examiner* — Spencer D Patton
(74) *Attorney, Agent, or Firm* — Sughrue Mion, PLLC

(57) ABSTRACT

A driving assist device comprises an electronic control unit configured to: acquire a vehicle present position that is a position at which a vehicle is present; calculate a positional relationship between a lane increase-decrease area and the vehicle, based on the lane increase-decrease area position and a vehicle present position; cause a human machine interface to output information about the lane increase-decrease area when a positional relationship is determined to satisfy a predetermined condition; acquire information about a traveling lane in which the vehicle is traveling; and cause the human machine interface to vary a way to output a information, based on whether or not the lane including the lane increase-decrease area and the traveling lane coincide with each other.

10 Claims, 9 Drawing Sheets

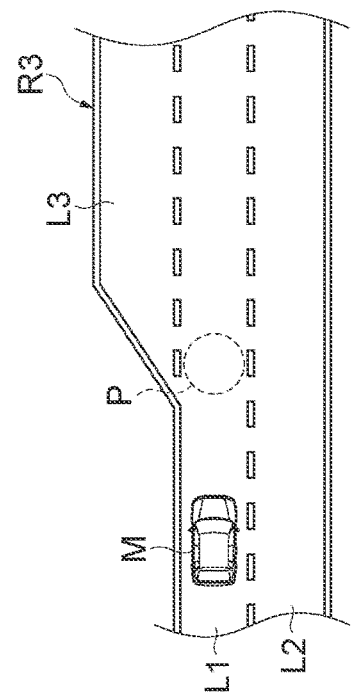
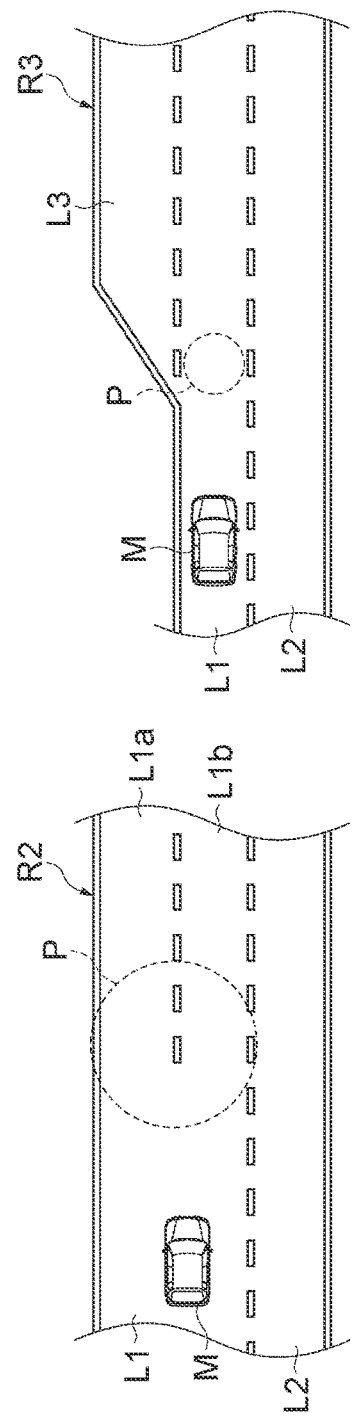
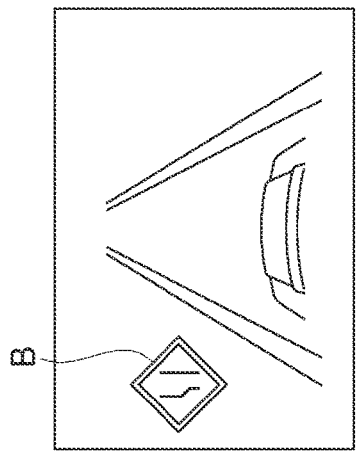

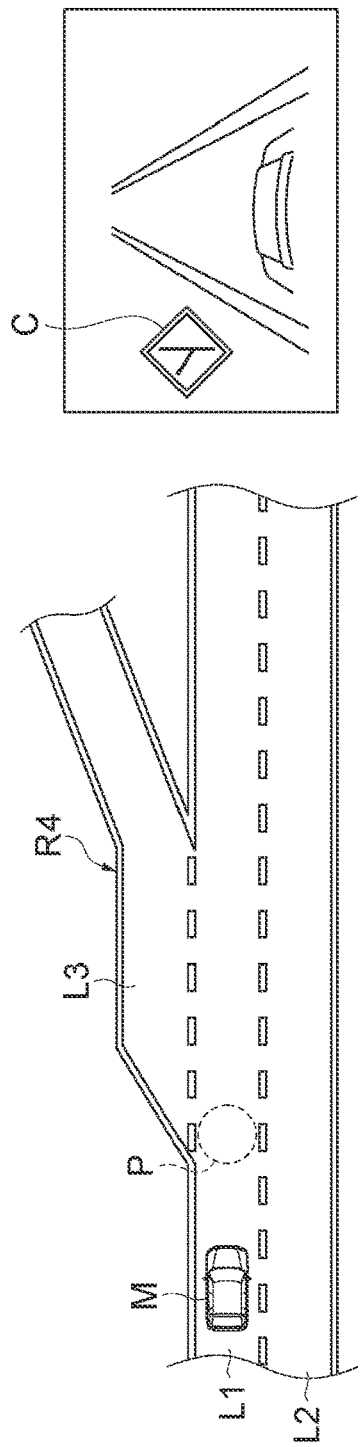

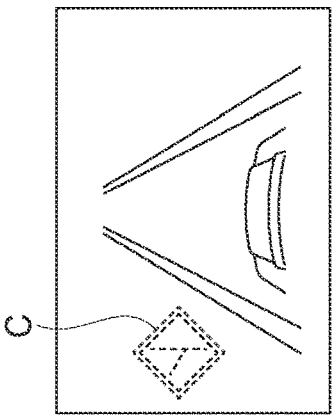
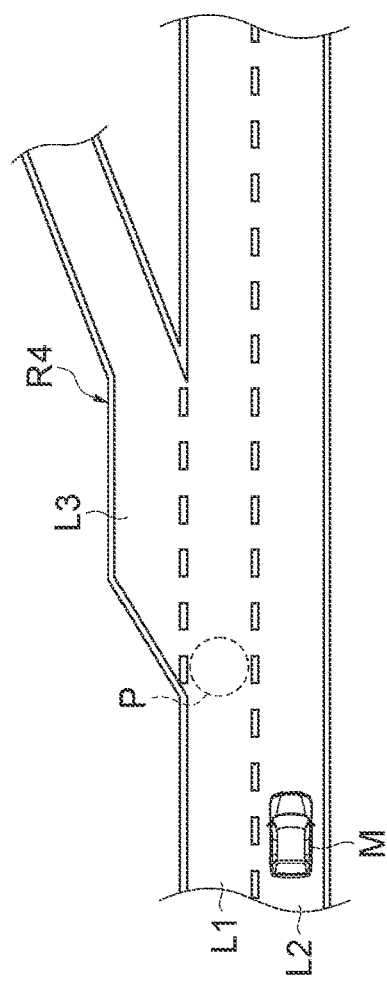

DRIVING ASSIST DEVICE

INCORPORATION BY REFERENCE

The disclosure of Japanese Patent Application No. 2015-171844 filed on Sep. 1, 2015 including the specification, drawings and abstract is incorporated herein by reference in its entirety.

BACKGROUND

1. Field of the Disclosure

The disclosure relates to a driving assist device.

2. Description of Related Art

As described in, for example, Japanese Patent Application Publication No. 2004-102536 (JP 2004-102536 A), there is a driving assist device that assists driving of a vehicle such that the vehicle travels along a lane. Such a driving assist device may stop driving assistance or have difficulty in providing the driving assistance when the number of lanes is increased or decreased, for example, when there is a point at which the number of lanes is decreased on a road. The driving assist device described in JP 2004-102536 A provides a notification of stoppage of the driving assistance when the vehicle enters an area where the driving assistance is stopped.

SUMMARY

When the vehicle enters an area where the driving assistance is stopped (or when the vehicle approaches an area where the driving assistance is stopped), the driving assist device described in JP 2004-102536 A provides a notification of stoppage of the driving assistance in a uniform manner. That is, the same notification is provided regardless of whether a lane increase-decrease area, which is created due to an increase or decrease in the number of lanes, is present on a lane in which the vehicle is traveling or is present on a lane other than the lane in which the vehicle is traveling. As a result, a driver of the vehicle cannot determine whether or not the lane increase-decrease area is present on the lane in which the vehicle is traveling. In view of this, in this technical field, there has been a demand for a driving assist device capable of providing an appropriate notification about a lane increase-decrease area, based on a lane on which the lane increase-decrease area is present.

A first aspect of the disclosure is a driving assist device including: an assist unit configured to execute lane keeping assistance as driving assistance for a vehicle; an acquiring unit configured to acquire positional information about a lane increase-decrease area in a road-extending direction on a road in which the vehicle is traveling, and lane information about the lane increase-decrease area in a road-width direction on the road in which the vehicle is traveling, based on a position of the vehicle and map information, the lane increase-decrease area being an area where the number of lanes is increased or decreased; a notification unit configured to provide a notification of presence of the lane increase-decrease area to a driver of the vehicle when a distance between the vehicle and the lane increase-decrease area positioned ahead of the vehicle in the road-extending direction is equal to or shorter than a threshold based on the position of the vehicle in the road-extending direction and the positional information about the lane increase-decrease area; a lane recognition unit configured to recognize a traveling lane in which the vehicle is traveling on the road; and a determination unit configured to determine whether or not the traveling lane includes the lane increase-decrease area, based on the lane information acquired by the acquiring unit and the traveling lane recognized by the lane recognition unit, wherein the notification unit is configured to make a level of intensity of the notification lower when the determination unit determines that the traveling lane does not include the lane increase-decrease area, than when the determination unit determines that the traveling lane includes the lane increase-decrease area.

According to the above aspect, the driver of the vehicle can recognize whether or not the traveling lane includes the lane increase-decrease area based on variation in the level of intensity of the notification provided by the notification unit. That is, the driver of the vehicle can recognize that the lane keeping assistance will be stopped or provision of the lane keeping assistance will become difficult because the traveling lane includes the lane increase-decrease area, based on the variation in the level of intensity of the notification provided by the notification unit. Further it is possible to prevent a notification with a high level of intensity from being provided despite the fact the lane increase-decrease area is present on a lane different from the lane in which the vehicle is traveling and the presence of the lane increase-decrease area is not directly related to the current traveling of the vehicle. In this manner, the driving assist device can provide an appropriate notification based on the lane on which the lane increase-decrease area is present.

According to the above aspect, the determination unit may be configured to determine, when determining that the traveling lane does not include the lane increase-decrease area, whether or not the traveling lane determined not to include the lane increase-decrease area is next to a lane including the lane increase-decrease area based on the lane information acquired by the acquiring unit and the traveling lane recognized by the lane recognition unit; and the notification unit may be configured to make the level of intensity of the notification lower when the determination unit determines that the traveling lane determined not to include the lane increase-decrease area is not next to the lane including the lane increase-decrease area, than when the determination unit determines that the traveling lane determined not to include the lane increase-decrease area is next to the lane including the lane increase-decrease area. According to the above aspect, even when the lane in which the vehicle is traveling does not include the lane increase-decrease area, the driver of the vehicle can recognize whether or not the traveling lane is next to the lane including the lane increase-decrease area.

A second aspect of the disclosure is a driving assist device comprising: a storage unit mounted in a vehicle, and the storage unit configured to store a lane increase-decrease area position that is a position where a lane increase-decrease area is present, and a lane including the lane increase-decrease area that is a lane on which the lane increase-decrease area is present, the lane increase-decrease area being an area where the number of lanes is increased or decreased; a human machine interface mounted in the vehicle, and the human machine interface configured to output information; and an electronic control unit including a processor, the electronic control unit configured to: acquire a vehicle present position that is a position at which the vehicle is present; calculate a positional relationship between the lane increase-decrease area and the vehicle, based on the lane increase-decrease area position and the vehicle present position; cause the human machine interface to output information about the lane increase-decrease area when the positional relationship is determined to satisfy a predetermined condition; acquire information about a traveling lane in which the vehicle is traveling; and cause the human machine interface to vary a way to output the information, based on whether or not the lane including the lane increase-decrease area and the traveling lane coincide with each other.

In the above aspect, the electronic control unit may be configured to output the information with greater emphasis when the lane including the lane increase-decrease area and the traveling lane coincide with each other, than when the lane including the lane increase-decrease area and the traveling lane differ from each other.

In the above aspect, the electronic control unit may be configured to output the information with greater emphasis when the lane including the lane increase-decrease area and the traveling lane differ from each other and the traveling lane is next to the lane including the lane increase-decrease area, than when the lane including the lane increase-decrease area and the traveling lane differ from each other and the traveling lane is not next to the lane including the lane increase-decrease area.

In the above aspect, the electronic control unit may be configured to vary saturation or brightness of the displayed information about the lane increase-decrease area.

In the above aspect, the electronic control unit may be configured to vary volume of a sound for providing a notification of the information about the lane increase-decrease area.

In the above aspect, the electronic control unit may be configured to:

calculate a distance between the lane increase-decrease area and the vehicle; and determine that the predetermined condition is satisfied when the distance is equal to or shorter than a threshold.

In the above aspect, the electronic control unit may be configured to set a determination target area based on the lane increase-decrease area position; and the electronic control unit may be configured to determine that the predetermined condition is satisfied when the vehicle present position is within the determination target area.

In the above aspect, the electronic control unit may be configured to provide lane keeping assistance for assisting driving of the vehicle such that the vehicle travels along the traveling lane; and control accuracy of the lane keeping assistance is lower when the distance is equal to or shorter than the threshold than when the distance is longer than the threshold.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5A is a plan view illustrating a case where, in a road in which the number of lanes is increased, a lane increase-decrease area is present on a lane in which the vehicle is traveling;

FIG. 5B is a plan view illustrating a case where, in a road in which the number of lanes is increased, a lane increase-decrease area is present on a lane in which the vehicle is traveling;

FIG. 5C is a view illustrating an example of an image displayed on the display unit in the cases illustrated in FIG. 5A and FIG. 5B;

FIG. 7A is a plan view illustrating a case where, on a road in which a lane branches out, a lane increase-decrease area is present on a lane in which the vehicle is traveling;

FIG. 7B is a view illustrating an example of an image displayed on the display unit in the case illustrated in FIG. 7A;

FIG. 8A is a plan view illustrating a case where, on a road in which a lane branches out, a lane increase-decrease area is present on a lane next to a lane in which the vehicle is traveling;

FIG. 8B is a view illustrating an example of an image displayed on the display unit in the case illustrated in FIG. 8A.

DETAILED DESCRIPTION OF EMBODIMENTS

Hereinafter, example embodiments of the disclosure will be described with reference to the accompanying drawings. Note that, in the description of the drawings, the same elements will be denoted by the same reference symbols and overlapping description thereof will be omitted.

Figure 1:
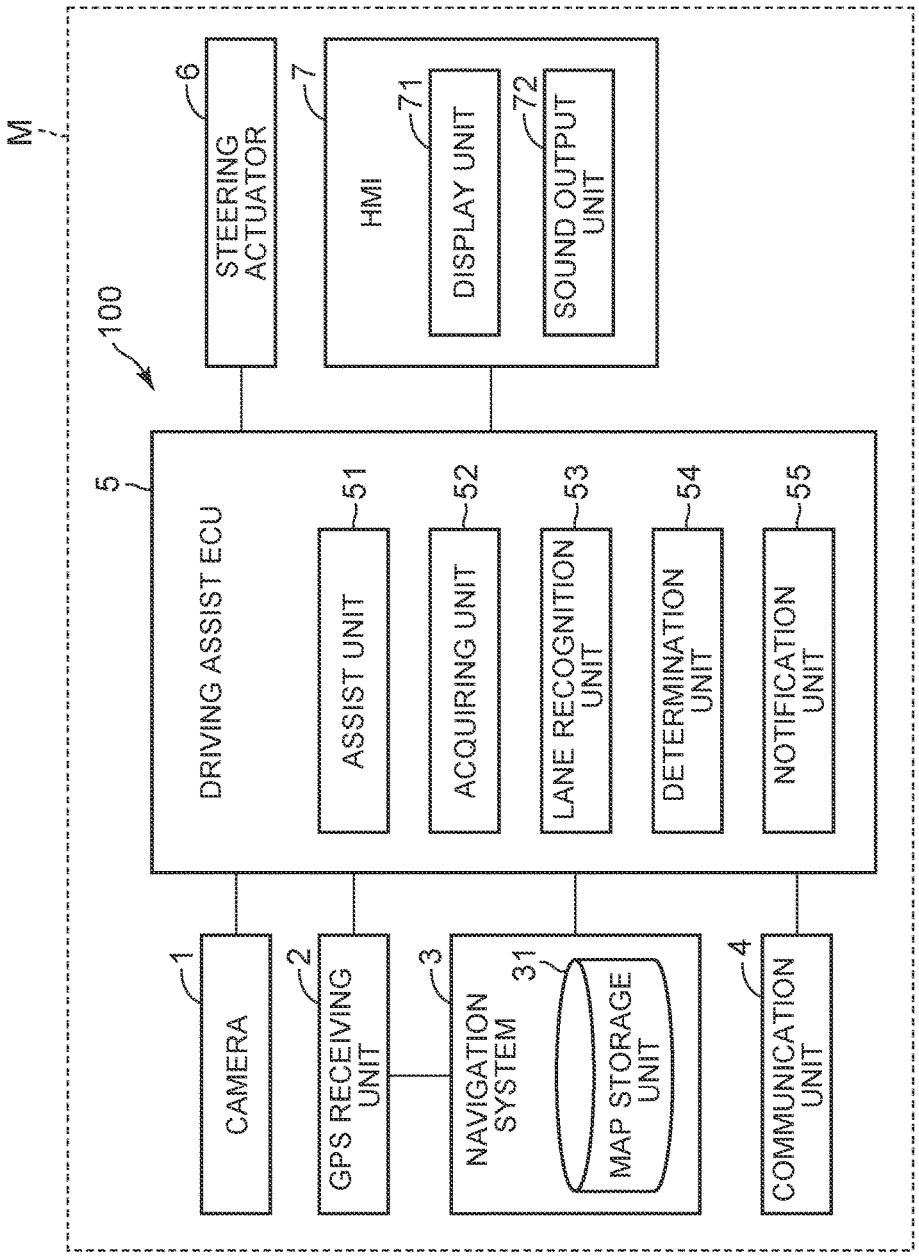
FIG. 1 is a block diagram illustrating the configuration of a driving assist device according to an embodiment.

A driving assist device 100 illustrated in FIG. 1 is mounted in a vehicle M, such as an automobile, to assist a driver in driving the vehicle M. The driving assist device 100 executes, as driving assistance, lane keeping assistance (LKA) to assist driving of the vehicle M such that the vehicle M travels along a traveling lane.

The lane keeping assistance according to the present embodiment is driving assistance for controlling the vehicle M such that the lateral position of the vehicle M is adjusted to a target lateral position in the traveling lane, and for reflecting, when the driver performs a steering operation, the steering operation in the traveling of the vehicle M. The traveling lane means a lane in which the vehicle M is traveling. The lateral position of the vehicle M means a position of the vehicle M in the width direction of the traveling lane. The lateral position of the vehicle M is recognized using, for example, the center position of the vehicle M in a planar view as a reference. The target lateral position means a control target position of the vehicle M in the lane keeping assistance. The target lateral position is set to, for example, the central position of the traveling lane in its width direction. Alternatively, the target lateral position may be set to a position offset from the central position of the traveling lane in its width direction.

The driving assist device 100 recognizes two white lines that define a traveling lane by, for example, a camera mounted in the vehicle M. Then, based on the recognized two white lines, the driving assist device 100 defines a position equidistant from the two white lines in the lane width direction as the central position of the traveling lane, and sets the position equidistant from the two white lines as the target lateral position for the lane keeping assistance. Further, the driving assist device 100 recognizes the lateral position of the vehicle M based on, for example, the positions of the two white lines in an image captured by the camera. The driving assist device 100 assists the vehicle M in traveling along the traveling lane, by applying steering torque to the vehicle M such that the lateral position of the vehicle M is adjusted to the target lateral position. The driving assist device 100 applies steering torque to a steering device of the vehicle M by, for example, controlling a steering actuator of the vehicle M.

Hereinafter, the configuration of the driving assist device 100 will be described. The driving assist device 100 includes a camera 1, a global positioning system (GPS) receiving unit 2, a navigation system 3, a communication unit 4, a driving assist electronic control unit (ECU) 5, a steering actuator 6, and a human machine interface (HMI) 7.

The camera 1 is an image capturing device that captures an image of a road ahead of the vehicle M. The camera 1 is provided, for example, on a vehicle cabin side with respect to a windshield of the vehicle M. The camera 1 transmits the captured image information to the driving assist ECU 5. The camera 1 may be a monocular camera or may be a stereo camera.

The GPS receiving unit 2 receives signals from three or more global positioning system (GPS) satellites to measure the position of the vehicle M (e.g. the latitude and longitude of the vehicle M). The GPS receiving unit 2 transmits the information about the measured position of the vehicle M to the driving assist ECU 5. Note that, instead of the GPS receiving unit 2, any means for identifying the latitude and longitude of the vehicle M may be used.

The navigation system 3 is a device that provides the driver of the vehicle M with route guidance to a destination set by the driver of the vehicle M. The navigation system 3 includes a map storage unit 31 that stores map information. The navigation system 3 calculates a route along which the vehicle M travels, based on the information about the position of the vehicle M measured by the GPS receiving unit 2 and the map information stored in the map storage unit 31. The navigation system 3, for example, computes a target route from the position of the vehicle M to the destination, and then notifies the driver of the target route, for example, by displaying the target route on a display unit or by outputting the target route by voice from a sound output unit.

When providing a notification of the target route, the navigation system 3 may use a display unit 71 and a sound output unit 72 of the HMI 7 (described later), or may use a display unit and a sound output unit provided in the navigation system 3. Note that the navigation system 3 may be provided in a computer in a facility, such as an information-processing center, capable of communicating with the vehicle M.

The map information stored in the map storage unit 31 includes, in addition to the information about roads or the like for providing route guidance to a destination, the positional information about a lane increase-decrease area, and the information about a lane on which a lane increase-decrease areas is present. Specifically, the lane increase-decrease area means an area in which the number of lanes is decreased, the number of lanes is increased, or a lane branches out. When an area in which the number of lanes is decreased, the number of lanes is increased, or a lane branches out is present on a lane in which the vehicle M is traveling, the driving assist device 100 may be unable to determine a lane along which the vehicle M should travel after passing through the lane increase-decrease area. As a result, in the lane increase-decrease area, the driving assist device 100 stops the lane keeping assistance or has difficulty in providing the lane keeping assistance. Note that "the driving assist device 100 has difficulty in providing the lane keeping assistance" means, for example, that the control accuracy of the lane keeping assistance is lowered.

The positional information about a lane increase-decrease area includes the information (e.g. the latitude and longitude) for identifying the position of an area in which the number of lanes is decreased, the number of lanes is increased, or a lane branches out. When a road includes a plurality of lanes, the lane information about a lane increase-decrease area is the information for identifying a lane on which the lane increase-decrease area is present in the road-width direction.

Figure 2A:
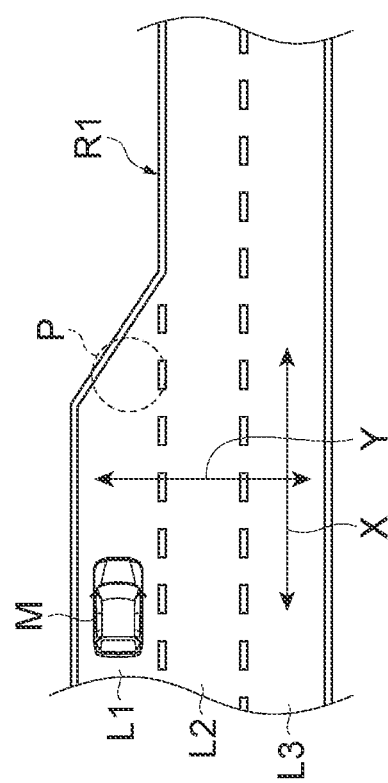
FIG. 2A is a plan view illustrating a case where, in a road in which the number of lanes is decreased, a lane increase-decrease area is present on a lane in which a vehicle is traveling.

First, an example of a lane increase-decrease area that is created due to a decrease in the number of lanes will be described. "The number of lanes is decreased" means that, in a road including a plurality of lanes, the number of lanes is decreased at a given point of the road. In other words, "the number of lanes is decreased" means that at least one of the lanes ends at a given point of the road. For example, when the vehicle M is traveling in a lane that will end due to a decrease in the number of lanes, the driving assist device 100 stops the lane keeping assistance or has difficulty in providing the lane keeping assistance because the lane ends. Thus, an area including a point at which the lane ends is defined as a lane increase-decrease area. Specifically, for example, as illustrated in FIG. 2A, there is a road R1 in which the number of lanes is decreased from three lanes, that is, a lane L1, a lane L2, and a lane L3, to two lanes, that is, the lane L2 and the lane L3. In this case, an area including a point at which the lane L1 ends (terminal point of the lane L1) is defined as a lane increase-decrease area P created due to a decrease in the number of lanes. That is, the lane increase-decrease area P is present on the lane L1. The lane information about the lane increase-decrease area P includes the information about the lane L1 on which the lane increase-decrease area P is present. Note that the lane increase-decrease area P may be an area having a predetermined size that is set such that the lane increase-decrease area P includes the point at which the lane L1 ends.

FIG. 2A illustrates a state where the vehicle M is traveling from the left side toward the right side in the drawing. That is, the lane increase-decrease area P is present ahead of the vehicle M in its traveling direction, and the vehicle M is traveling toward the lane increase-decrease area P. FIG. 3A, FIG. 4A, FIG. 5A, FIG. 5B, FIG. 6A, FIG. 6B, FIG. 7A and FIG. 8A, as well as FIG. 2A, each illustrate a state where the vehicle M is traveling from the left side toward the right side in the drawing.

Next, an example of a lane increase-decrease area created due to an increase in the number of lanes will be described. "The number of lanes is increased" means that the number of lanes is increased at a given point of a road. Examples of the case where the number of lanes is increased include a case where one lane is turned into two lanes at a given point of a road. Specifically, for example, as in a road R2 illustrated in FIG. 5A, the number of lanes is increased from one lane, that is, a lane L1, into two lanes, that is, a lane L1a and a lane L1b. Examples of the case where the number of lanes is increased further include a case where a new lane is provided at a position on the lateral side of a given lane. Specifically, for example, as in a road R3 illustrated in FIG. 5B, a lane L3 is newly provided on the left side of a lane L1 at a given point of the road R3.

For example, when the vehicle M is traveling in a lane in which the number of lanes is increased at a given point of a road, in the example illustrated in FIG. 5A, the driving assist device 100 has difficulty in determining which of the lane L1a and the lane L1b the vehicle M should travel along at the point at which the number of lanes is increased. Similarly, in the example illustrated in FIG. 5B, the driving assist device 100 has difficulty in determining which of the lane L1 and the newly provided lane L3 the vehicle M should travel along. In view of this, when the number of lanes is increased, the driving assist device 100 stops the lane keeping assistance or has difficulty in providing the lane keeping assistance. As described above, an area including a point at which the number of lanes is increased is defined as a lane increase-decrease area.

Specifically, for example, as illustrated in FIG. 5A, in the road R2 in which the number of lanes is increased, that is, the lane L1 is turned into the lane L1a and the lane L1b, the area including the point at which the lane L1 is turned into the lane L1a and the lane L1b is defined as the lane increase-decrease area P. That is, the lane increase-decrease area P is present on the lane L1. The lane information about the lane increase-decrease area P includes the information about the lane L1, that is, the lane on which the lane increase-decrease area P is present. Note that the lane increase-decrease area P may be an area having a predetermined size that is set such that the lane increase-decrease area P includes the point at which the number of lanes is increased.

Similarly, for example, as illustrated in FIG. 5B, in the road R3 in which the lane L3 is newly provided on the left side of the lane L1, the area including a point on the lane L1, the point corresponding to the start point of the lane L3 (the point at which the lane L3 starts) in the lane width direction is defined as the lane increase-decrease area P. That is, the lane increase-decrease area P is present on the lane L1. The lane information about the lane increase-decrease area P includes the information about the lane L1, that is, the lane on which the lane increase-decrease area P is present. Note that the lane increase-decrease area P may be an area having a predetermined size that is set such that the lane increase-decrease area P includes the point on the lane L1, the point corresponding to the start point of the lane L3 in the lane width direction.

Next, an example of a lane increase-decrease area created due to branching-out of a lane will be described. "A lane branches out" means that a branch lane is connected to the lateral side of a given lane. Branching-out of a lane may be regarded as a kind of an increase in the number of lanes because the branch lane is newly provided. Specifically, for example, as in a road R4 illustrated in FIG. 7A, a lane L3 that serves as a branch lane is connected to the left side of the lane L1. That is, the lane L1 branches out into the lane L1 and the lane L3.

For example, when the vehicle M is traveling in a lane that will branch out, in the example illustrated in FIG. 7A, the driving assist device 100 has difficulty in determining which of the lane L1 and the lane L3 the vehicle M should travel along at the point at which the lane L1 branches out into the lane L1 and the lane L3. In view of this, when the lane branches out, the driving assist device 100 stops the lane keeping assistance or has difficulty in providing the lane keeping assistance. As described above, an area including a point at which a lane branches out is defined as a lane increase-decrease area. Specifically, for example, as illustrated in FIG. 7A, in a road R4 in which the lane L3 that serves as the branch lane is connected to the left side of the lane L1, the area including the point on the lane L1, the point corresponding to the start point of the lane L3 (the end portion of the lane L3, which is connected to the lane L1) in the lane width direction, is defined as the lane increase-decrease area P. That is, the lane increase-decrease area P is present on the lane L1. The lane information about the lane increase-decrease area P includes the information about the lane L1, that is, the lane on which the lane increase-decrease area P is present. Note that the lane increase-decrease area P may be an area having a predetermined size that is set such that the lane increase-decrease area P includes the point at which the lane branches out.

The map information stored in the map storage unit 31 may further include the number of white lines provided on a road and the kinds of the white lines. Further, the map information stored in the map storage unit 31 may include the number of lanes provided on a road.

The communication unit 4 acquires the map information including the positional information and lane information about a lane increase-decrease area by communicating with a computer in a facility, such as an information-processing center, outside the vehicle M. Examples of the information-processing center may include an information-processing center that collects the positional information and lane information about an area in which the lane keeping assistance is stopped or provision of the lane keeping assistance becomes difficult when the vehicle M or a vehicle other than the vehicle M actually travels in the area. Thus, the driving assist device 100 can use the map information stored in a computer in a facility, such as an information-processing center, in addition to the map information stored in the map storage unit 31 of the navigation system 3.

The steering actuator 6 controls driving of an assist motor that controls steering torque (output of the actuator) in an electric power steering system, based on a command control value provided from the driving assist ECU 5. In this way, the steering actuator 6 controls the steering torque to be applied to the vehicle M.

The HMI 7 is an interface that receives information from an occupant (e.g. a driver) of the vehicle M and outputs the information to the driving assist device 100, or receives information from the driving assist device 100 and outputs the information to the occupant. The HMI 7 includes, for example, a display unit 71, such as a display, which displays image information to the occupant, a sound output unit 72, such as a speaker, which outputs information by voice, and an operation button, a touch panel or the like, with which the occupant performs an input operation. When an input operation for starting or stopping the lane keeping assistance is performed by the occupant, the HMI 7 outputs a signal to the driving assist ECU 5 to start or stop the lane keeping assistance.

The driving assist ECU 5 executes, for example, control of traveling of the vehicle M. The driving assist ECU 5 is an electronic control unit including, for example, a central processing unit (CPU), a read-only memory (ROM), and a random-access memory (RAM). In the driving assist ECU 5, programs stored in the ROM are loaded into the RAM and the programs are executed by the CPU, so that various kinds of controls are executed. The driving assist ECU 5 may be constituted by a plurality of electronic control units.

The driving assist ECU 5 includes an assist unit 51, an acquiring unit 52, a lane recognition unit 53, a determination unit 54, and a notification unit 55. The assist unit 51 provides lane keeping assistance for assisting driving of the vehicle M such that the vehicle M travels along a traveling lane. Specifically, the assist unit 51 starts the lane keeping assistance in response to, for example, a switch operation performed by the driver. The assist unit 51 recognizes white line of the lane in which the vehicle M is traveling through image analysis based on, for example, an image of a road ahead the vehicle M captured by the camera 1. The assist unit 51 recognizes the lateral position of the vehicle M in the traveling lane based on, for example, the positions of the recognized white lines in the image. Next, the assist unit 51 controls traveling of the vehicle M by applying steering torque to the vehicle M such that the recognized lateral position of the vehicle M is adjusted to the target lateral position. The assist unit 51 transmits a control signal to the steering actuator 6 to apply steering torque to the vehicle M. In this case, the target lateral position may be set to, for example, the central position of the traveling lane in its width direction, or may be set to a position offset from the central position of the traveling lane in its width direction.

Based on the position of the vehicle M and the map information, the acquiring unit 52 acquires the positional information about the lane increase-decrease area in the road-extending direction (for example, the direction indicated by an arrow X in FIG. 2A) on the road on which the vehicle M is traveling, and the lane information about the lane increase-decrease area in the road-width direction (for example, the direction indicated by an arrow Y in FIG. 2A). The acquiring unit 52 can acquire the position of the vehicle M based on the positioning result provided from the GPS receiving unit 2. The acquiring unit 52 acquires the map information from the map storage unit 31 of the navigation system 3. Alternatively, the acquiring unit 52 may acquire the map information from a computer in a facility, such as an information-processing center, through the use of the communication unit 4. The acquiring unit 52 acquires the positional information and lane information about the lane increase-decrease area present on the road ahead of the vehicle M in its traveling direction. The acquiring unit 52 may acquire the positional information and lane information about the lane increase-decrease area present ahead within a predetermined distance from the current position of the vehicle M in its traveling direction.

The lane recognition unit 53 recognizes the lane in which the vehicle M is traveling, on the road on which the vehicle M is traveling. That is, the lane recognition unit 53 recognizes the lane in which the vehicle M is traveling, in a road including a plurality of lanes. The lane recognition unit 53 recognizes the traveling lane by a known method, based on, for example, an image of the road ahead the vehicle M captured by the camera 1. Specifically, for example, the lane recognition unit 53 recognizes the white lines of the road ahead of the vehicle M through image analysis, based on an image of the road ahead the vehicle M captured by the camera 1. The lane recognition unit 53 can recognize the lane in which the vehicle M is traveling, based on, for example, the number of the recognized white lines on the road, and the positional relationship between the white lines and the vehicle M. In some cases, the information about the number of white lines provided on a road, the kinds of the white lines, and the number of lanes, is included in the map information stored in the map storage unit 31 of the navigation system 3. In such a case, the lane recognition unit 53 may recognize the lane in which the vehicle M is traveling based on the information about the number of white lines, the kinds of the white lines, and the number of lanes, in addition to the image captured by the camera 1.

The determination unit 54 determines whether or not the lane in which the vehicle M is traveling includes a lane increase-decrease area, based on the lane information acquired by the acquiring unit 52 and the traveling lane recognized by the lane recognition unit 53. Specifically, the determination unit 54 determines whether the lane in which the vehicle M is traveling is a target lane that includes a lane increase-decrease area, or the traveling lane is a non-target lane that does not include a lane increase-decrease area, based on the lane information about a lane increase-decrease area acquired by the acquiring unit 52 and the traveling lane recognized by the lane recognition unit 53. For the traveling lane ahead of the vehicle M within a predetermined distance from the current position of the vehicle M, the determination unit 54 can determine whether or not the traveling lane includes a lane increase-decrease area. When the lane in which the vehicle M is traveling includes a lane increase-decrease area, that is, when a lane increase-decrease area is present on the traveling lane, the determination unit 54 determines that the lane in which the vehicle M is traveling is a target lane. When the lane in which the vehicle M is traveling does not include a lane increase-decrease area, that is, when a lane increase-decrease area is not present on the traveling lane, the determination unit 54 determines that the lane in which the vehicle M is traveling is a non-target lane.

For example, in the example illustrated in FIG. 2A, the lane increase-decrease area P is present on the lane L1, that is, the lane in which the vehicle M is traveling. Thus, the determination unit 54 determines that the lane in which the vehicle M is traveling (lane L1) is a target lane. In the example illustrated in FIG. 3A, the lane increase-decrease area P is not present on the lane L2, that is, the lane in which the vehicle M is traveling. Thus, the determination unit 54 determines that the lane in which the vehicle M is traveling (lane L2) is a non-target lane. In the example illustrated in FIG. 4A, the lane increase-decrease area P is not present on the lane L3, that is, the lane in which the vehicle M is traveling. Thus, the determination unit 54 determines that the lane in which the vehicle M is traveling (lane L3) is a non-target lane.

In the examples illustrated in FIG. 5A, FIG. 5B, and FIG. 7A, the lane increase-decrease area P is present on the lane L1, that is, the lane in which the vehicle M is traveling. Thus, the determination unit 54 determines that the lane in which the vehicle M is traveling (lane L1) is a target lane. In the examples illustrated in FIG. 6A, FIG. 6B, and FIG. 8A, the lane increase-decrease area P is not present on the lane L2, that is, the lane in which the vehicle M is traveling. Thus, the determination unit 54 determines that the lane in which the vehicle M is traveling (lane L2) is a non-target lane.

Figure 3B:
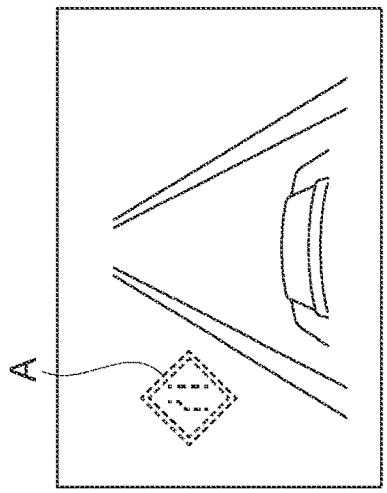
FIG. 3B is a view illustrating an example of an image displayed on the display unit in the case illustrated in FIG. 3A.
Figure 3A:
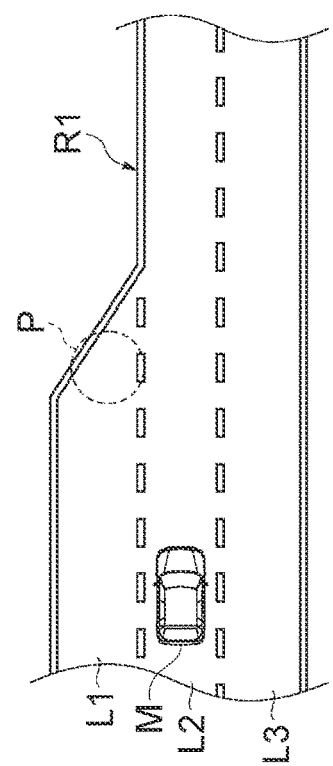
FIG. 3A is a plan view illustrating a case where, in a road in which the number of lanes is decreased, a lane increase-decrease area is present on a lane next to a lane in which the vehicle is traveling.
Figure 4A:
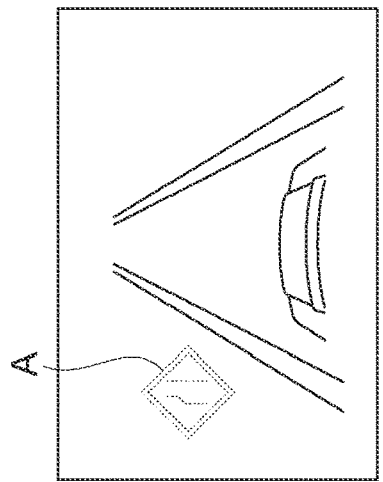
FIG. 4A is a plan view illustrating a case where, in a road in which the number of lanes is decreased, a lane increase-decrease area is present on a second lane from a lane in which the vehicle is traveling (i.e., there is one lane between the lane on which the lane increase-decrease area is present and the lane in which the vehicle is traveling)

When the determination unit 54 determines that the traveling lane is a non-target lane, the determination unit 54 determines whether or not the traveling lane determined to be a non-target lane is next to the lane including the lane increase-decrease area P. For example, in the examples illustrated in FIG. 3A and FIG. 4A, the lane increase-decrease area P is present on the lane L1. Thus, when the vehicle M is traveling in the lane L2 as illustrated in FIG. 3A, the determination unit 54 determines that the lane in which the vehicle M is traveling is next to the lane including the lane increase-decrease area P (lane L1). When the vehicle M is traveling in the lane L3 as illustrated in FIG. 4A, the determination unit 54 determines that the lane in which the vehicle M is traveling is not next to the lane including the lane increase-decrease area P (lane L1).

Figure 6A:
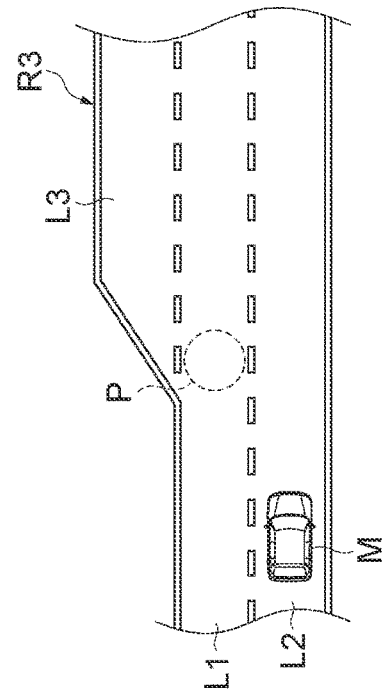
FIG. 6A is a plan view illustrating a case where, in a road in which the number of lanes is increased, a lane increase-decrease area is present on a lane next to a lane in which the vehicle is traveling.
Figure 6B:
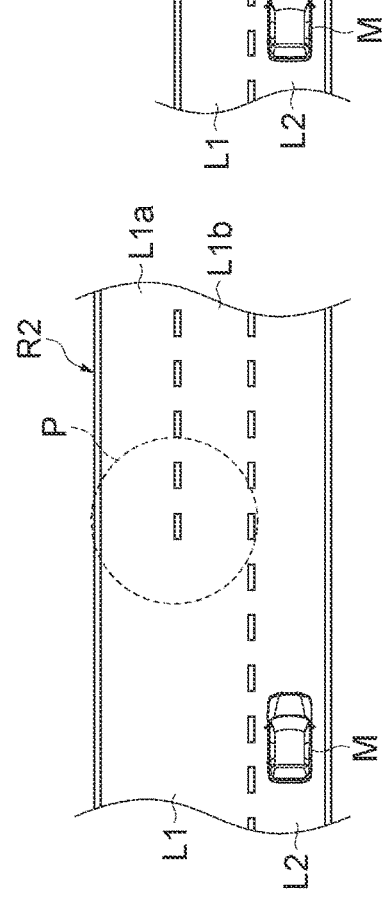
FIG. 6B is a plan view illustrating a case where, in a road in which the number of lanes is increased, a lane increase-decrease area is present on a lane next to a lane in which the vehicle is traveling.

For example, in the examples illustrated in FIG. 6A, FIG. 6B, and FIG. 8A, the lane increase-decrease area P is present on the lane L1. Thus, when the vehicle M is traveling in the lane L2 as illustrated in FIG. 6A, FIG. 6B, and FIG. 8A, the determination unit 54 determines that the lane in which the vehicle M is traveling is next to the lane including the lane increase-decrease area P (lane L1).

The notification unit 55 determines whether or not the distance between the vehicle M and the lane increase-decrease area positioned ahead of the vehicle M is equal to or shorter than a threshold, based on the position of the vehicle M in the road-extending direction and the positional information about the lane increase-decrease area. The distance between the vehicle M and the lane increase-decrease area is the distance between the vehicle M and the lane increase-decrease area along the road extending direction. The distance between the vehicle M and the lane increase-decrease area may be the distance from the vehicle M to the point of the entrance to the lane increase-decrease area. Alternatively, the distance between the vehicle M and the lane increase-decrease area may be the distance from the vehicle M to the end point of the lane, the distance from the vehicle M to the point at which the number of lanes is increased, or the distance from the vehicle M to the point at which the lane branches out. The notification unit 55 can calculate the distance between the vehicle M and the lane increase-decrease area along the road, based on, for example, the map data stored in the map storage unit 31. The notification unit 55 can acquire the position of the vehicle M based on the positioning result provided from the GPS receiving unit 2.

When the distance between the vehicle M and the lane increase-decrease area is equal to or shorter than the threshold, the notification unit 55 notifies the driver of the vehicle M of the presence of the lane increase-decrease area on the road. The notification unit 55 provides a notification of the presence of the lane increase-decrease area by using at least one of the display unit 71 and the sound output unit 72. When providing a notification, the notification unit 55 makes the level of intensity of the notification lower when the determination unit 54 determines that the traveling lane does not include the lane increase-decrease area, than when the determination unit 54 determines that the traveling lane includes the lane increase-decrease area. Specifically, when providing a notification, the notification unit 55 makes the level of intensity of the notification lower when the determination unit 54 determines that the traveling lane is a non-target lane, than when the determination unit 54 determines that the traveling lane is a target lane.

Note that a notification with a high level of intensity may be such a notification that a driver can notice provision of the notification more easily than provision of a notification with a low level of intensity. Alternatively, a notification with a high level of intensity may be such a notification that a driver can recognize the contents of the notification more easily than the contents of a notification with a low level of intensity.

The notification unit 55 makes the level of intensity of a notification lower when the traveling lane determined, by the determination unit 54, to be a lane that does not include the lane increase-decrease area is not next to the lane including the lane increase-decrease area, than when the traveling lane determined, by the determination unit 54, to be a lane that does not include the lane increase-decrease area is next to the lane including the lane increase-decrease area. Specifically, the notification unit 55 may vary the level of intensity of a notification that is provided when the traveling lane is determined to be a non-target lane, depending on whether or not the lane in which the vehicle M is traveling is next to the lane including the lane increase-decrease area P. More specifically, the notification unit 55 may make the level of intensity of a notification lower when the traveling lane determined, by the determination unit 54, to be a non-target lane is not next to the lane including the lane increase-decrease area P, than when the traveling lane determined, by the determination unit 54, to be a non-target lane is next to the lane including the lane increase-decrease area P.

In other words, when the lane in which the vehicle M is traveling is the target lane (lane L1) as illustrated in FIG. 2A, the notification unit 55 provides a notification with a high level of intensity. As illustrated in FIG. 3A, when the lane in which the vehicle M is traveling is a non-target lane and is next to the lane including the lane increase-decrease area P (lane L1), the notification unit 55 provides a notification with a medium level of intensity. As illustrated in FIG. 4A, when the lane in which the vehicle M is traveling is a non-target lane and is not next to the lane including the lane increase-decrease area P (lane L1), the notification unit 55 provides a notification with a low level of intensity. Note that a notification with a high level of intensity is higher in intensity than a notification with a medium level of intensity. A notification with a medium level of intensity is higher in intensity than a notification with a low level of intensity.

Thus, the driver of the vehicle M can recognize whether or not the traveling lane is a target lane based on the level of intensity of a notification. Even when the lane in which the vehicle M is traveling is a non-target lane, the driver of the vehicle M can recognize whether or not the traveling lane is next to the lane including the lane increase-decrease area P based on the level of intensity of a notification.

Specifically, when a notification is provided by use of the display unit 71, the notification unit 55 makes the saturation of an icon displayed on the display unit 71 higher, for example, when a notification with a high level of intensity is provided, than when a notification with medium or low level of intensity is provided. The notification unit 55 makes the saturation of an icon displayed on the display unit 71 higher, for example, when a notification with a medium level of intensity is provided, than when a notification with a low level of intensity is provided. The icon means a mark for notifying the driver that a lane increase-decrease area is present on the road and the distance between the vehicle M and the lane increase-decrease area is equal to or shorter than a threshold.

The driver can recognize whether the traveling lane is a target lane or a non-target lane based on the saturation of the icon displayed on the display unit 71. Even when the lane in which the vehicle M is traveling is a non-target lane, the driver can recognize whether or not the traveling lane is next to the lane including the lane increase-decrease area P based on the saturation of the icon displayed on the display unit 71.

The higher the level of intensity of a notification is, the higher the saturation of an icon displayed on the display unit 71 is. As the level of intensity of the notification is higher, the driver can recognize the icon more easily, that is, the driver can recognize provision of the notification more easily.

When a notification is provided by use of the sound output unit 72, the notification unit 55 makes the volume of a sound output from the sound output unit 72 larger, for example, when a notification with a high level of intensity is provided, than when a notification with medium or low level of intensity is provided. The notification unit 55 makes the volume of a sound output from the sound output unit 72 larger, for example, when a notification with a medium level of intensity is provided, than when a notification with a low level of intensity is provided. The sound output from the sound output unit 72 is a sound for notifying the driver that a lane increase-decrease area is present on the road and the distance between the vehicle M and the lane increase-decrease area is equal to or shorter than a threshold. The sound output from the sound output unit 72 may be a voice, a signal sound, or a combination of a voice and a signal sound.

The driver can recognize whether the traveling lane is a target lane or a non-target lane based on the volume of a sound output from the sound output unit 72. Even when the lane in which the vehicle M is traveling is a non-target lane, the driver can recognize whether or not the traveling lane is next to the lane including the lane increase-decrease area P based on the volume of a sound output from the sound output unit 72. The higher the level of intensity of a notification is, the larger the volume of a sound output from the sound output unit 72 is. As the level of intensity of the notification is higher, the driver can catch the sound more easily, that is, the driver can recognize provision of the notification more easily.

Figure 2B:
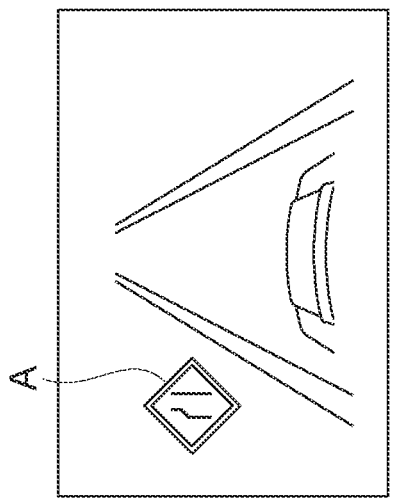
FIG. 2B is a view illustrating an example of an image displayed on a display unit in the case illustrated in FIG. 2A.

Next, a specific example of a display screen when a notification is provided by use of the display unit 71 will be described. First, a notification that is provided when the lane in which the vehicle M is traveling is the target lane (lane L1) as illustrated in FIG. 2A will be described. In this case, as illustrated in FIG. 2B, the notification unit 55 displays an icon A with high saturation, as a notification with a high level of intensity, on the display unit 71. The icon A is an example of an icon indicating that the number of lanes will be decreased. Note that, in FIG. 2B, a front end portion of the vehicle M and the white lines on both sides of the vehicle M are displayed in addition to the icon A. The same is applied to other examples of images displayed on the display unit 71.

Figure 4B:
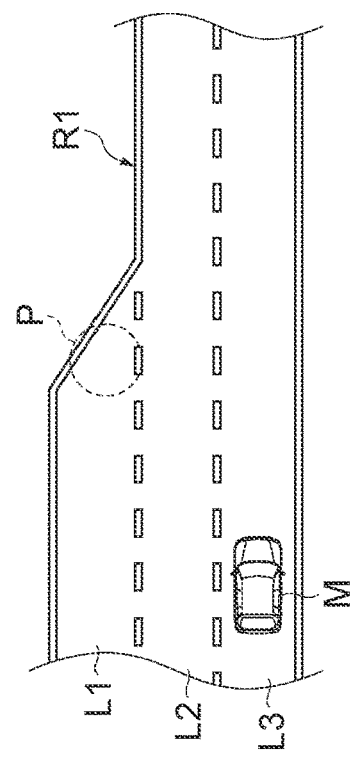
FIG. 4B is a view illustrating an example of an image displayed on the display unit in the case illustrated in FIG. 4A.

A notification that is provided when the lane in which the vehicle M is traveling is a non-target lane and the traveling lane is next to the lane including the lane increase-decrease area P (lane L1) as illustrated in FIG. 3A will be described. In this case, as illustrated in FIG. 3B, the notification unit 55 displays an icon A with lower saturation than that of the icon A illustrated in FIG. 2B, as a notification with a medium level of intensity, on the display unit 71. A notification that is provided when the lane in which the vehicle M is traveling is a non-target lane and the traveling lane is not next to the lane including the lane increase-decrease area P (lane L1) as illustrated in FIG. 4A will be described. In this case, as illustrated in FIG. 4B, the notification unit 55 displays an icon A with lower saturation than that of the icon A illustrated in FIG. 3B, as a notification with a low level of intensity, on the display unit 71.

Figure 6C:
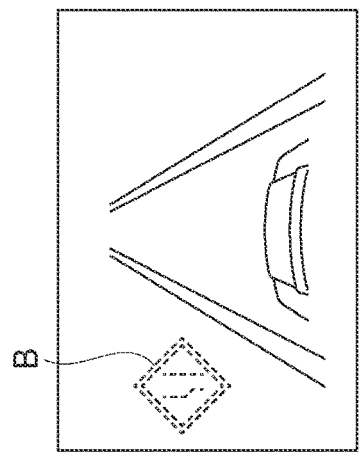
FIG. 6C is a view illustrating an example of an image displayed on the display unit in the cases illustrated in FIG. 6A and FIG. 6B.

A notification that is provided when the lane in which the vehicle M is traveling is the target lane (lane L1) as illustrated in FIG. 5A and FIG. 5B will be described. In this case, as illustrated in FIG. 5C, the notification unit 55 displays an icon B with high saturation, as a notification with a high level of intensity, on the display unit 71. The icon B is an example of an icon indicating that the number of lanes will be increased. A notification that is provided when the lane in which the vehicle M is traveling is a non-target lane and the traveling lane is next to the lane including the lane increase-decrease area P as illustrated in FIG. 6A and FIG. 6B will be described. In this case, as illustrated in FIG. 6C, the notification unit 55 displays an icon B with lower saturation than that of the icon B illustrated in FIG. 5C, as a notification with a medium level of intensity, on the display unit 71.

The case where the lane in which the vehicle M is traveling is a target lane (lane L1) as illustrated in FIG. 7A will be described. In this case, as illustrated in FIG. 7B, the notification unit 55 displays an icon C with high saturation, as a notification with a high level of intensity, on the display unit 71. The icon C is an example of an icon indicating that a lane will branch out. A notification that is provided when the lane in which the vehicle M is traveling is a non-target lane and the traveling lane is next to the lane including the lane increase-decrease area P as illustrated in FIG. 8A will be described. In this case, as illustrated in FIG. 8B, the notification unit 55 displays an icon C with lower saturation than that of the icon C illustrated in FIG. 7B, as a notification with a medium level of intensity, on the display unit 71.

The notification unit 55 provides the above-described notification when the distance between the vehicle M and the lane increase-decrease area P is equal to or shorter than the threshold. The notification unit 55 stops provision of the notification when the vehicle M has passed the lane increase-decrease area P on the road. Whether or not the vehicle M has passed the lane increase-decrease area P can be made based on, for example, the position of the vehicle M, the positional information about the lane increase-decrease area P, and the map data stored in the map storage unit 31.

Figure 9:
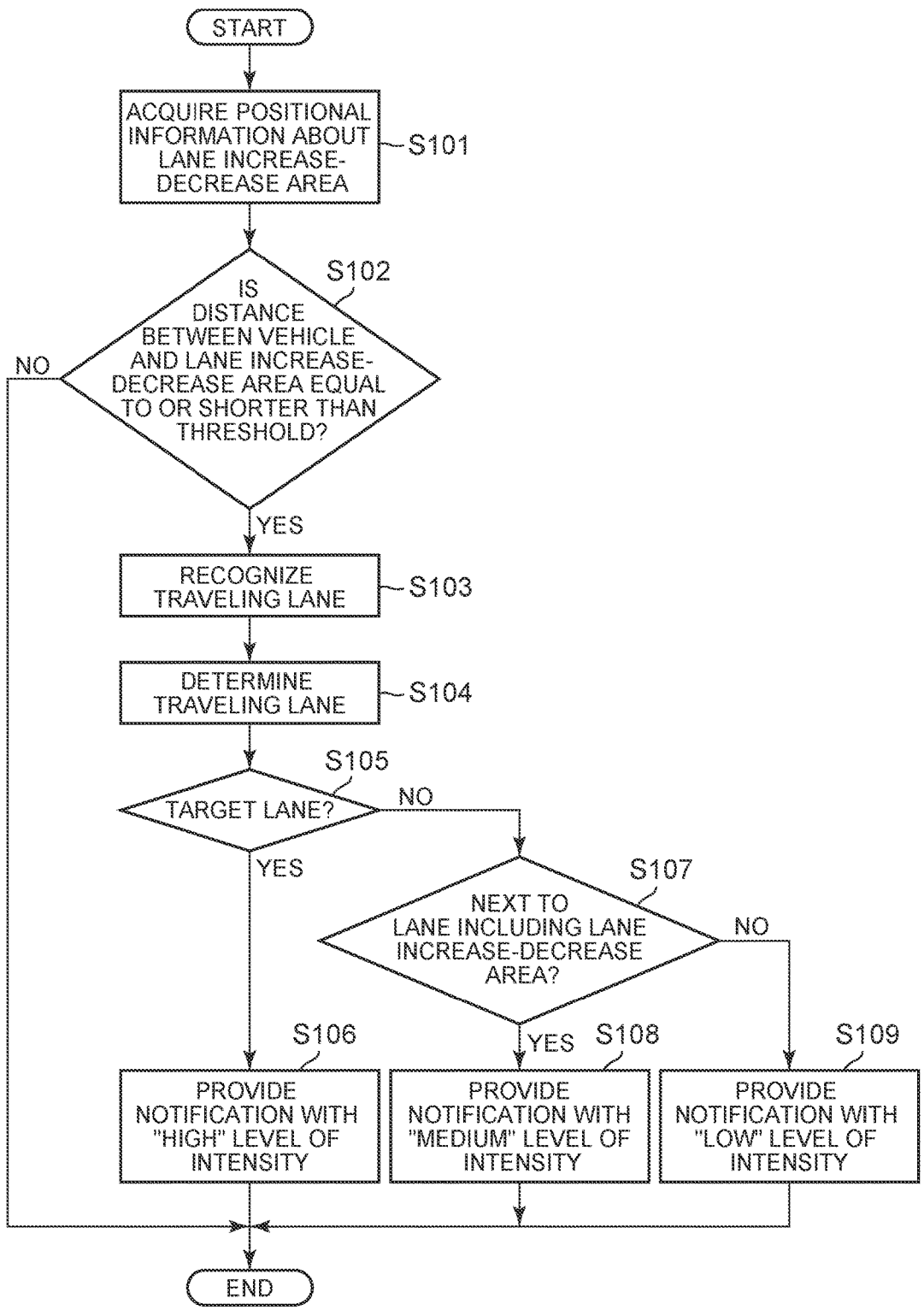
FIG. 9 is a flowchart illustrating the procedure of a process for providing a notification of the presence of a lane increase-decrease area.

Next, the procedure of a process for providing a notification of the presence of a lane increase-decrease area will be described. The process in a flowchart illustrated in FIG. 9 is executed by the driving assist ECU 5 when the lane keeping assistance for the vehicle M is started by the assist unit 51. When the process in the flowchart reaches END, the driving assist ECU 5 repeats the process again from START. Alternatively, the driving assist ECU 5 may execute the process repeatedly from START at predetermined time intervals. In the case where the process is executed repeatedly at predetermined time intervals, even if the preceding process has not reach END when the process is newly started from START (even if the process is being executed), the driving assist ECU 5 terminates the preceding process. When the lane keeping assistance for the vehicle M is completed, the driving assist ECU 5 terminates the process in the flowchart even if the process is being executed. When the vehicle M has passed the lane increase-decrease area P on a road, the notification unit 55 terminates the process in the flowchart even if the process is being executed.

As illustrated in FIG. 9, when the lane keeping assistance by the assist unit 51 is started, the acquiring unit 52 acquires the positional information about the lane increase-decrease area on the road on which the vehicle M is traveling, based on the position of the vehicle M and the map information (S101). The notification unit 55 determines whether or not the distance between the vehicle M and the lane increase-decrease area is equal to or shorter than the threshold (S102). When the distance between the vehicle M and the lane increase-decrease area is longer than the threshold (S102: NO), the driving assist ECU 5 terminates the current process, and newly starts the process from START. Note that, when the positional information about the lane increase-decrease area is not acquired in S101, the distance between the vehicle M and the lane increase-decrease area cannot be calculated, and thus the notification unit 55 may make a negative determination in the process in S102. Then, the driving assist ECU 5 may terminate the current process, and may newly start the process from START. When the distance between the vehicle M and the lane increase-decrease area is equal to or shorter than the threshold (S102: YES), the lane recognition unit 53 recognizes the lane in which the vehicle M is traveling on the road on which the vehicle M is traveling (S103).

The determination unit 54 determines whether the lane in which the vehicle M is traveling is a target lane that includes the lane increase-decrease area P, or the traveling lane is a non-target lane that does not include the lane increase-decrease area P (S104). When the lane in which the vehicle M is traveling is the target lane (S105: YES), the notification unit 55 provides a notification with a high level of intensity (S106). After providing the notification with a high level of intensity, the driving assist ECU 5 terminates the current process, and newly starts the process from START.

When the lane in which the vehicle M is traveling is a non-target lane instead of the target lane (S105: NO), the determination unit 54 determines whether or not the lane in which the vehicle M is traveling, which is determined to be a non-target lane, is next to the lane including the lane increase-decrease area P (S107). When the lane in which the vehicle M is traveling, which is determined to be a non-target lane, is next to the lane including the lane increase-decrease area P (S107: YES), the notification unit 55 provides a notification with a medium level of intensity (S108). After providing the notification with a medium level of intensity, the driving assist ECU 5 terminates the current process, and newly starts the process from START.

When the lane in which the vehicle M is traveling, which is determined to be a non-target lane, is not next to the lane including the lane increase-decrease area P (S107: NO), the notification unit 55 provides a notification with a low level of intensity (S109). After providing the notification with a low level of intensity, the driving assist ECU 5 terminates the current process, and newly starts the process from START.

The present embodiment is implemented as described above. When the determination unit 54 determines that the traveling lane is a non-target lane, the notification unit 55 of the driving assist device 100 makes the level of intensity of a notification lower than that when the determination unit 54 determines that the traveling lane is a target lane. Thus, the driver of the vehicle M can recognize whether or not the traveling lane includes the lane increase-decrease area P based on the variation in the level of intensity of a notification provided by the notification unit 55. That is, based on the variation in the level of intensity of a notification provided by the notification unit 55, the driver of the vehicle M can recognize whether or not the lane keeping assistance will be stopped or provision of the lane keeping assistance will be difficult because the traveling lane includes the lane increase-decrease area. Further it is possible to prevent a notification with a high level of intensity from being provided despite the fact the lane increase-decrease area P is present on a lane different from the lane in which the vehicle M is traveling and the presence of the lane increase-decrease area P is not directly related to the current traveling of the vehicle M. In this manner, the driving assist device 100 can provide an appropriate notification based on the lane on which the lane increase-decrease area P is present.

When the traveling lane, which is determined to be a non-target lane by the determination unit 54, is not next to the lane including the lane increase-decrease area P, the notification unit 55 makes the level of intensity of a notification lower than that when the traveling lane, which is determined to be a non-target lane by the determination unit 54, is next to the lane including the lane increase-decrease area P. That is, when the lane in which the vehicle M is traveling is a non-target lane and is next to the lane including the lane increase-decrease area P, the notification unit 55 provides a notification with a medium level of intensity. When the lane in which the vehicle M is traveling is a non-target lane and is not next to the lane including the lane increase-decrease area P, the notification unit 55 provides a notification with a low level of intensity. In this case, even when the lane in which the vehicle M is traveling is a non-target lane, the driver of the vehicle M can recognize whether or not the traveling lane is next to the lane including the lane increase-decrease area P based on the level of intensity of the notification.

The embodiment of the disclosure has been described above; however, embodiments of the disclosure are not limited to the above-described embodiment. For example, the notification unit 55 provides a notification when the distance between the vehicle M and the lane increase-decrease area is equal to or shorter than the threshold; however, the notification may be provided when the vehicle M enters a determination target area. Specifically, the notification unit 55 sets the determination target area at a position between the lane increase-decrease area and a point apart from the lane increase-decrease area by a predetermined distance in a direction toward the vehicle M, based on the positional information about the lane increase-decrease area ahead of the vehicle M, which is acquired by the acquiring unit 52. The notification unit 55 can set the determination target area along the road on which the vehicle M is traveling. When the determination target area is set along the road, the notification unit 55 may set the determination target area based on, for example, the map data stored in the map storage unit 31. The notification unit 55 provides a notification when the vehicle M enters the determination target area, based on the position of the vehicle M on the road and the set determination target area. As in the above-described embodiment, in providing a notification, the notification unit 55 varies the level of intensity of the notification based on whether the lane in which the vehicle M is traveling is a target lane or a non-target lane. As in the above-described embodiment, in providing a notification, when the lane in which the vehicle M is traveling is a non-target lane, the notification unit 55 may vary the level of intensity of the notification based on whether the lane in which the vehicle M is traveling is next to the lane including the lane increase-decrease area. The notification unit 55 stops provision of the notification when the position of the vehicle M comes out of the determination target area. Note that providing a notification when the vehicle M enters the determination target area is equivalent to providing a notification when the distance between the vehicle M and the lane increase-decrease area P is equal to or shorter than the threshold as described in the embodiment, except that whether or not the vehicle M enters the determination target area is used to make a determination or the distance between the vehicle M and the lane increase-decrease area is used to make a determination.

Note that, when the lane in which the vehicle M is traveling is a non-target lane, it is not necessary for the determination unit 54 to determine whether or not the lane in which the vehicle M is traveling is next to the lane including the lane increase-decrease area P. Further, when the lane in which the vehicle M is traveling is a non-target lane, it is not necessary to vary the level of intensity of a notification depending on whether or not the lane in which the vehicle M is traveling is next to the lane including the lane increase-decrease area P.

When a notification is provided by use of the display unit 71, the notification unit 55 varies the saturation of an icon to vary the level of intensity of the notification; however, other than the saturation, for example, brightness may be varied to vary the level of intensity of the notification.

What is claimed is:

1. A driving assist device comprising:
    an assist unit configured to execute lane keeping assistance as driving assistance for a vehicle;
    an acquiring unit configured to acquire positional information about a lane increase-decrease area in a road-extending direction on a road in which the vehicle is traveling, and lane information about the lane increase-decrease area in a road-width direction on the road in which the vehicle is traveling, based on a position of the vehicle and map information, the lane increase-decrease area being an area where the number of lanes is increased or decreased;
    a notification unit configured to provide a notification of presence of the lane increase-decrease area to a driver of the vehicle when a distance between the vehicle and the lane increase-decrease area positioned ahead of the vehicle in the road-extending direction is equal to or shorter than a threshold based on the position of the vehicle in the road-extending direction and the positional information about the lane increase-decrease area;
    a lane recognition unit configured to recognize a traveling lane in which the vehicle is traveling on the road; and
    a determination unit configured to determine whether or not the traveling lane includes the lane increase-decrease area, based on the lane information acquired by the acquiring unit and the traveling lane recognized by the lane recognition unit, wherein
    the notification unit is configured to make a level of intensity of the notification lower when the determination unit determines that the traveling lane does not include the lane increase-decrease area, than when the determination unit determines that the traveling lane includes the lane increase-decrease area,
    wherein, when the notification unit provides the notification of presence of the lane increase-decrease area to the driver of the vehicle when the distance between the vehicle and the lane increase-decrease area positioned ahead of the vehicle in the road-extending direction is equal to or shorter than the threshold, the notification is provided when the traveling lane does not include the lane increase-decrease area and when the traveling lane does include the lane increase-decrease area.

2. The driving assist device according to claim 1, wherein:
    the determination unit is configured to determine, when determining that the traveling lane does not include the lane increase-decrease area, whether or not the traveling lane determined not to include the lane increase-decrease area is next to a lane including the lane increase-decrease area based on the lane information acquired by the acquiring unit and the traveling lane recognized by the lane recognition unit; and
    the notification unit is configured to make the level of intensity of the notification lower when the determination unit determines that the traveling lane determined not to include the lane increase-decrease area is not next to the lane including the lane increase-decrease area, than when the determination unit determines that the traveling lane determined not to include the lane increase-decrease area is next to the lane including the lane increase-decrease area.

3. A driving assist device comprising:
    a storage unit mounted in a vehicle, and the storage unit configured to store a lane increase-decrease area position that is a position where a lane increase-decrease area is present, and a lane including the lane increase-decrease area that is a lane on which the lane increase-decrease area is present, the lane increase-decrease area being an area where the number of lanes is increased or decreased;
    a human machine interface mounted in the vehicle, and the human machine interface configured to output information; and
    an electronic control unit including a processor, the electronic control unit configured to:
        acquire a vehicle present position that is a position at which the vehicle is present;
        calculate a positional relationship between the lane increase-decrease area and the vehicle, based on the lane increase-decrease area position and the vehicle present position;
        cause the human machine interface to output information about the lane increase-decrease area when the positional relationship is determined to satisfy a predetermined condition;
        acquire information about a traveling lane in which the vehicle is traveling; and
        cause the human machine interface to vary a way to output the information, based on whether or not the lane including the lane increase-decrease area and the traveling lane coincide with each other,
    wherein, when the human machine interface outputs the information about the presence of the lane increase-decrease area to the driver of the vehicle when the positional relationship is determined to satisfy the predetermined condition, the information is output when the traveling lane does not include the lane increase-decrease area and when the traveling lane does include the lane increase-decrease area, wherein the electronic control unit is configured to output the information with greater emphasis when the lane including the lane increase-decrease area and the traveling lane coincide with each other, than when the lane including the lane increase-decrease area and the traveling lane differ from each other, wherein the electronic control unit is configured to output the information with greater emphasis when the lane including the lane increase-decrease area and the traveling lane differ from each other and the traveling lane is next to the lane including the lane increase-decrease area, than when the lane including the lane increase-decrease area and the traveling lane differ from each other and the traveling lane is not next to the lane including the lane increase-decrease area.

4. The driving assist device according to claim 3, wherein the electronic control unit is configured to vary saturation or brightness of the displayed information about the lane increase-decrease area.

5. The driving assist device according to claim 3, wherein the electronic control unit is configured to vary volume of a sound for providing a notification of the information about the lane increase-decrease area.

6. The driving assist device according to claim 3, wherein the electronic control unit is configured to:
calculate a distance between the lane increase-decrease area and the vehicle; and
determine that the predetermined condition is satisfied when the distance is equal to or shorter than a threshold.

7. The driving assist device according to claim 6, wherein:
the electronic control unit is configured to provide lane keeping assistance for assisting driving of the vehicle such that the vehicle travels along the traveling lane; and
control accuracy of the lane keeping assistance is lower when the distance between the lane increase-decrease area and the vehicle is equal to or shorter than the threshold than when the distance between the lane increase-decrease area and the vehicle is longer than the threshold.

8. The driving assist device according to claim 3, wherein:
the electronic control unit is configured to set a determination target area based on the lane increase-decrease area position; and
the electronic control unit is configured to determine that the predetermined condition is satisfied when the vehicle present position is within the determination target area.

9. A driving assist device comprising:
an electronic control unit (ECU) programmed to:
execute lane keeping assistance as driving assistance for a vehicle;
acquire positional information about a lane increase-decrease area in a road-extending direction on a road in which the vehicle is traveling, and lane information about the lane increase-decrease area in a road-width direction on the road in which the vehicle is traveling, based on a position of the vehicle and map information, the lane increase-decrease area being an area where the number of lanes is increased or decreased;
provide a notification of presence of the lane increase-decrease area to a driver of the vehicle when a distance between the vehicle and the lane increase-decrease area positioned ahead of the vehicle in the road-extending direction is equal to or shorter than a threshold based on the position of the vehicle in the road-extending direction and the positional information about the lane increase-decrease area;
recognize a traveling lane in which the vehicle is traveling on the road; and
determine whether or not the traveling lane includes the lane increase-decrease area, based on the lane information and the traveling lane, wherein
a level of intensity of the notification is lower when the traveling lane does not include the lane increase-decrease area, than when the traveling lane includes the lane increase-decrease area, wherein the ECU is further programmed to:
determine, when determining that the traveling lane does not include the lane increase-decrease area, whether or not the traveling lane determined not to include the lane increase-decrease area is next to a lane including the lane increase-decrease area based on the lane information and the traveling lane; and
make the level of intensity of the notification lower when the traveling lane determined not to include the lane increase-decrease area is also not next to the lane including the lane increase-decrease area, than when the traveling lane determined not to include the lane increase-decrease area is next to the lane including the lane increase-decrease area,
wherein, when the ECU provides the notification of presence of the lane increase-decrease area to the driver of the vehicle when the distance between the vehicle and the lane increase-decrease area positioned ahead of the vehicle in the road-extending direction is equal to or shorter than the threshold, the notification is provided when the traveling lane does not include the lane increase-decrease area and when the traveling lane does include the lane increase-decrease area.

10. A driving assist device comprising:
a storage unit mounted in a vehicle, and the storage unit configured to store a lane increase-decrease area position that is a position where a lane increase-decrease area is present, and a lane including the lane increase-decrease area that is a lane on which the lane increase-decrease area is present, the lane increase-decrease area being an area where the number of lanes is increased or decreased;
a human machine interface mounted in the vehicle, and the human machine interface configured to output information; and
an electronic control unit including a processor, the electronic control unit configured to:
acquire a vehicle present position that is a position at which the vehicle is present;
calculate a positional relationship between the lane increase-decrease area and the vehicle, based on the lane increase-decrease area position and the vehicle present position;
cause the human machine interface to output information about the lane increase-decrease area when the positional relationship is determined to satisfy a predetermined condition;
acquire information about a traveling lane in which the vehicle is traveling; and
cause the human machine interface to vary a way to output the information, based on whether or not the lane including the lane increase-decrease area and the traveling lane coincide with each other,
wherein, when the human machine interface outputs the information about the presence of the lane increase-decrease area to the driver of the vehicle when the positional relationship is determined to satisfy the predetermined condition, the information is output when the traveling lane does not include the lane increase-decrease area and when the traveling lane does include the lane increase-decrease area,
wherein the electronic control unit is configured to:
calculate a distance between the lane increase-decrease area and the vehicle;
determine that the predetermined condition is satisfied when the distance is equal to or shorter than a threshold;

provide lane keeping assistance for assisting driving of the vehicle such that the vehicle travels along the traveling lane; and control accuracy of the lane keeping assistance is lower when the distance between the lane increase-decrease area and the vehicle is equal to or shorter than the threshold than when the distance between the lane increase-decrease area and the vehicle is longer than the threshold.

* * * * *